United States Patent
Porte et al.

(10) Patent No.: US 11,220,343 B2
(45) Date of Patent: *Jan. 11, 2022

(54) FROST PROTECTION SYSTEM FOR AN AIRCRAFT ENGINE NACELLE

(71) Applicant: Airbus Operations SAS, Toulouse (FR)

(72) Inventors: Alain Porte, Colomiers (FR); Jonathan Carcone, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 306 days.

This patent is subject to a terminal disclaimer.

(21) Appl. No.: 16/156,272

(22) Filed: Oct. 10, 2018

(65) Prior Publication Data

US 2019/0118955 A1    Apr. 25, 2019

(30) Foreign Application Priority Data

Oct. 20, 2017   (FR) ...................................... 1759920

(51) Int. Cl.
| | |
|---|---|
| *B64D 15/04* | (2006.01) |
| *F02C 7/045* | (2006.01) |
| *B64D 33/02* | (2006.01) |
| *F02C 7/047* | (2006.01) |
| *B64D 29/00* | (2006.01) |

(52) U.S. Cl.
CPC ............ *B64D 15/04* (2013.01); *B64D 29/00* (2013.01); *B64D 33/02* (2013.01); *F02C 7/045* (2013.01); *F02C 7/047* (2013.01); *B64D 2033/0206* (2013.01); *B64D 2033/0233* (2013.01); *F05D 2260/208* (2013.01)

(58) Field of Classification Search
CPC ................... B64D 15/02; B64D 15/04; B64D 2033/0233; F01D 25/02; F02C 6/08; F02C 7/047; F05B 2260/208; F28D 2021/0021; F28D 2021/008; F28F 19/006
See application file for complete search history.

(56) References Cited

U.S. PATENT DOCUMENTS

| | | | | |
|---|---|---|---|---|
| 4,674,714 A | * | 6/1987 | Cole ....................... | B64D 15/04 244/134 B |
| 6,027,078 A | * | 2/2000 | Crouch ................... | B64C 21/00 244/204 |

(Continued)

FOREIGN PATENT DOCUMENTS

| | | |
|---|---|---|
| EP | 0939028 A2 | 9/1999 |
| EP | 1895123 A2 | 3/2008 |

(Continued)

OTHER PUBLICATIONS

French Search Report; priority document.

*Primary Examiner* — Richard R. Green
*Assistant Examiner* — Arfan Y. Sinaki
(74) *Attorney, Agent, or Firm* — Greer, Burns & Crain, Ltd.

(57) ABSTRACT

A frost protection system for an aircraft engine nacelle, the nacelle comprising an inner shroud provided with at least one acoustic panel and an air intake lip forming a leading edge of the nacelle. The protection system comprises a heat exchanger device including at least one heat pipe configured to transfer heat emitted by a heat source to the at least one acoustic panel.

10 Claims, 3 Drawing Sheets

(56) References Cited

U.S. PATENT DOCUMENTS

| | | | | |
|---|---|---|---|---|
| 10,533,497 B2* | 1/2020 | Welch | ............... | F02C 7/045 |
| 2005/0050877 A1 | 3/2005 | Venkataramani et al. | | |
| 2008/0053100 A1* | 3/2008 | Venkataramani | ......... | F02C 7/14 |
| | | | | 60/772 |
| 2009/0120099 A1* | 5/2009 | Brand | ............... | F01D 25/02 |
| | | | | 60/785 |
| 2012/0048389 A1 | 3/2012 | Chelin et al. | | |
| 2015/0291284 A1* | 10/2015 | Victor | ............... | B64D 15/04 |
| | | | | 244/134 B |
| 2016/0097323 A1* | 4/2016 | Prather | ............... | F02C 7/047 |
| | | | | 415/178 |
| 2017/0184026 A1* | 6/2017 | Elbibary | ............... | F02C 7/12 |
| 2017/0363094 A1* | 12/2017 | Kumar | ............... | F04D 27/002 |

FOREIGN PATENT DOCUMENTS

| | | | | |
|---|---|---|---|---|
| FR | 2859500 A1 | 3/2005 | | |
| FR | 2995497 A1 | 3/2014 | | |
| GB | 2136880 A * | 9/1984 | ............. | F02C 7/047 |
| WO | 2010086560 A2 | 8/2010 | | |

\* cited by examiner

FROST PROTECTION SYSTEM FOR AN AIRCRAFT ENGINE NACELLE

CROSS-REFERENCES TO RELATED APPLICATIONS

This application claims the benefit of the French patent application No. 1759920 filed on Oct. 20, 2017, the entire disclosures of which are incorporated herein by way of reference.

BACKGROUND OF THE INVENTION

The present invention relates to a frost protection system for an air intake of an aircraft engine nacelle and to the nacelle provided with such a protection system.

The leading edges of aircraft, in particular the air intake lips of the aircraft engine nacelles, may by subject to the formation of frost, which builds up to form blocks of ice. The formation of these blocks of ice may interfere with the supply of air to the engine. For example, blocks of ice may come loose and collide with the engine fan blades. The fan blades are therefore liable to be embrittled, or even broken, thereby.

There exists a frost protection system that draws hot air from compression stages of the aircraft engine in order to inject it into an annular space located behind the lip of the nacelle. The hot air then flows through the annular space, heats the lip and is sent into channels in acoustic panels in order to heat the skin of the acoustic panels. However, the skin of the acoustic panels is heated over a short distance, which results in defrosting over a short distance. This distance may be insufficient for very short air intakes. Specifically, the shortening of the air intakes may result in the surface of the acoustic channels becoming aerodynamically more sensitive.

SUMMARY OF THE INVENTION

An object of the present invention is to overcome these drawbacks by providing a frost protection system for a nacelle.

To this end, the invention relates to a frost protection system for an aircraft engine nacelle, the nacelle comprising an inner shroud provided with at least one acoustic panel.

According to the invention, the protection system comprises a heat exchanger device including at least one heat pipe configured to transfer heat emitted by a heat source to the one or more acoustic panels.

Thus, due to the invention, the acoustic panels are more effectively and cost-efficiently protected from frost by virtue of the one or more heat pipes. The heat emitted by a heat source is used to defrost all of the acoustic panels of the nacelle rather than just a portion of the acoustic panels located in the vicinity of the lip.

According to one particularity, the heat exchanger device further comprises:

a heat transfer fluid;

at least one evaporator that is thermally connected to the heat source, the one or more evaporators being configured to extract at least a portion of the heat supplied by the heat source, the extracted heat being transferred to the heat transfer fluid;

at least one condenser attached to the inner shroud, the one or more condensers being configured to deliver at least a portion of the heat extracted by the one or more evaporators to the one or more acoustic panels, the extracted heat being transferred to the one or more condensers via the heat transfer fluid;

each of the evaporators being fluidically connected to at least one condenser by at least one heat pipe through which the heat transfer fluid flows.

Additionally, the one or more heat pipes comprise:

at least one steam pipe configured to convey, from the evaporator to the condenser, the heat transfer fluid vaporized by the heat extracted by the evaporator;

at least one liquid pipe configured to convey, from the condenser to the evaporator, the heat transfer fluid condensed by cooling in the condenser.

Moreover, the one or more condensers comprise one or more heating channels.

The invention also relates to an aircraft engine nacelle comprising an inner shroud provided with at least one acoustic panel.

According to the invention, the nacelle comprises a frost protection system such as described above.

Additionally, the nacelle comprises an air intake lip forming a leading edge of the nacelle, the lip having an annular space, the annular space being closed by an internal partition and being arranged to receive a hot air supply, the one or more evaporators being connected by attachment to the internal partition, the one or more evaporators being configured to extract at least a portion of the heat supplied through the internal partition by the hot air being supplied to the annular space of the lip, the extracted heat being transferred to the heat transfer fluid.

The invention also relates to an aircraft, in particular a transport plane, fitted with at least one engine surrounded by a nacelle, the nacelle comprising an inner shroud provided with at least one acoustic panel.

According to the invention, the aircraft comprises a frost protection system such as described above.

According to one embodiment, the nacelle comprises an air intake lip forming a leading edge of the nacelle, the lip having an annular space, the annular space being closed by an internal partition and being arranged to receive a hot air supply, the heat source corresponding to the internal partition, the one or more evaporators being connected by attachment to the internal partition, the one or more evaporators being configured to extract at least a portion of the heat supplied through the internal partition by the hot air being supplied to the annular space of the lip, the extracted heat being transferred to the heat transfer fluid, the aircraft comprising at least one air-heating device configured to produce the hot air being supplied to the annular space of each of the nacelles.

Moreover, the aircraft comprises:

at least one duct linking the one or more air-heating devices to the annular space of each of the nacelles, the one or more ducts being configured to convey the hot air produced by the air-heating device to the annular space of the lip, at least one valve for each of the ducts which is configured to regulate the pressure and the flow rate of the hot air flowing through the one or more ducts.

Additionally, the air-heating device corresponds to compression stages of the engine surrounded by the nacelle.

According to another embodiment, the aircraft comprises an electrical system corresponding to the heat source.

According to one variant embodiment, the electrical system corresponds to an electrical device dedicated to the production of heat for the frost protection system.

According to another variant, the electrical system corresponds to a typical electrical device dedicated to supplying electrical power to the aircraft.

BRIEF DESCRIPTION OF THE DRAWINGS

The invention, with its features and advantages, will become more clearly apparent upon reading the description given with reference to the appended drawings, in which.

DETAILED DESCRIPTION OF THE PREFERRED EMBODIMENTS

Figure 2:
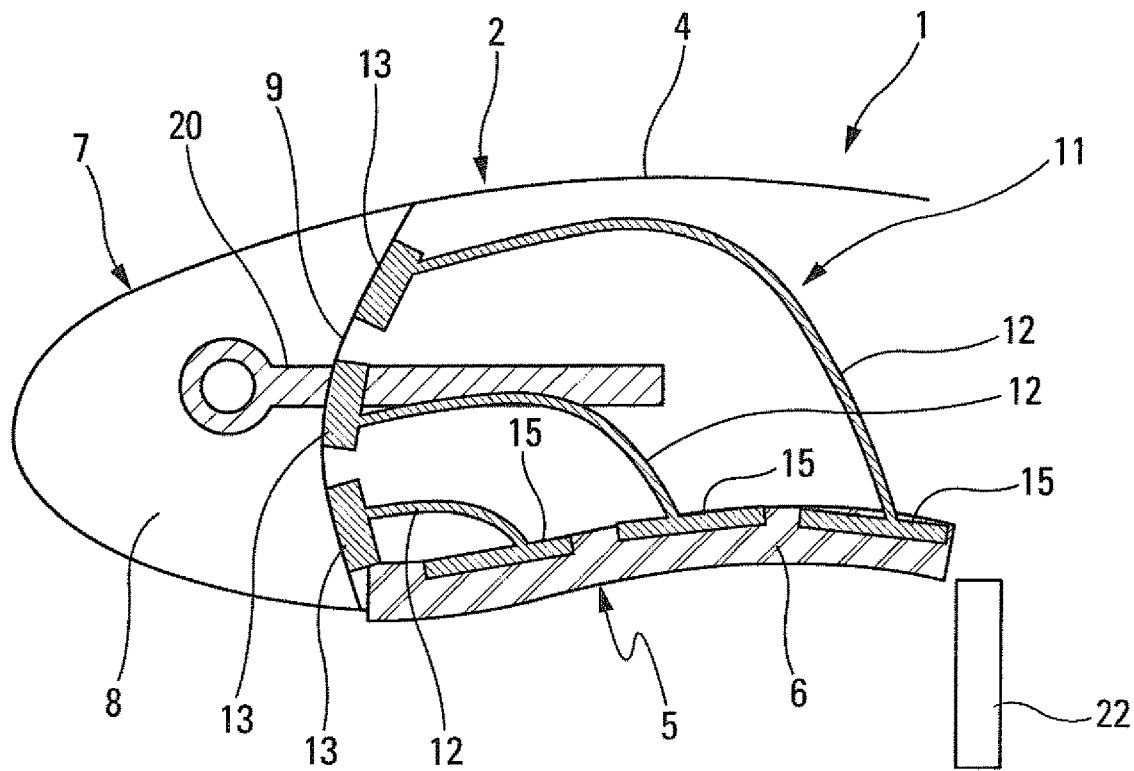
FIG. 2 shows a longitudinal section of a lip comprising the frost protection system according to one embodiment.
Figure 6:
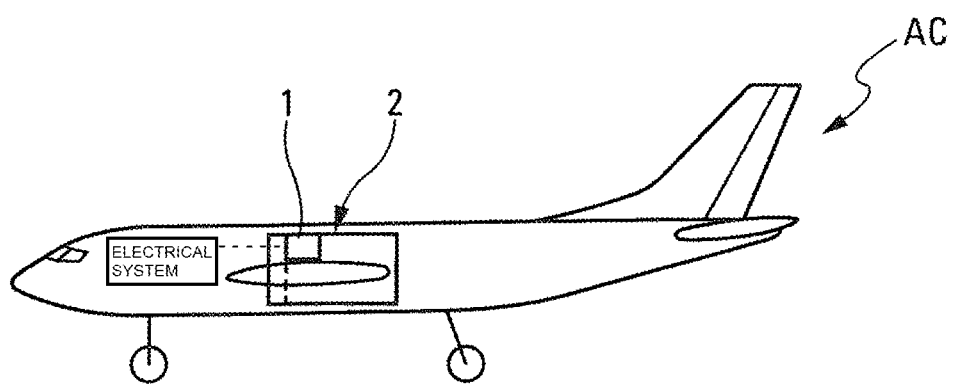
FIG. 6 shows a profile view of an aircraft comprising the frost protection system according to one embodiment.

FIG. 2 schematically shows one embodiment of a frost protection system for an aircraft AC engine 3 nacelle 2 (FIG. 6).

Figure 1:
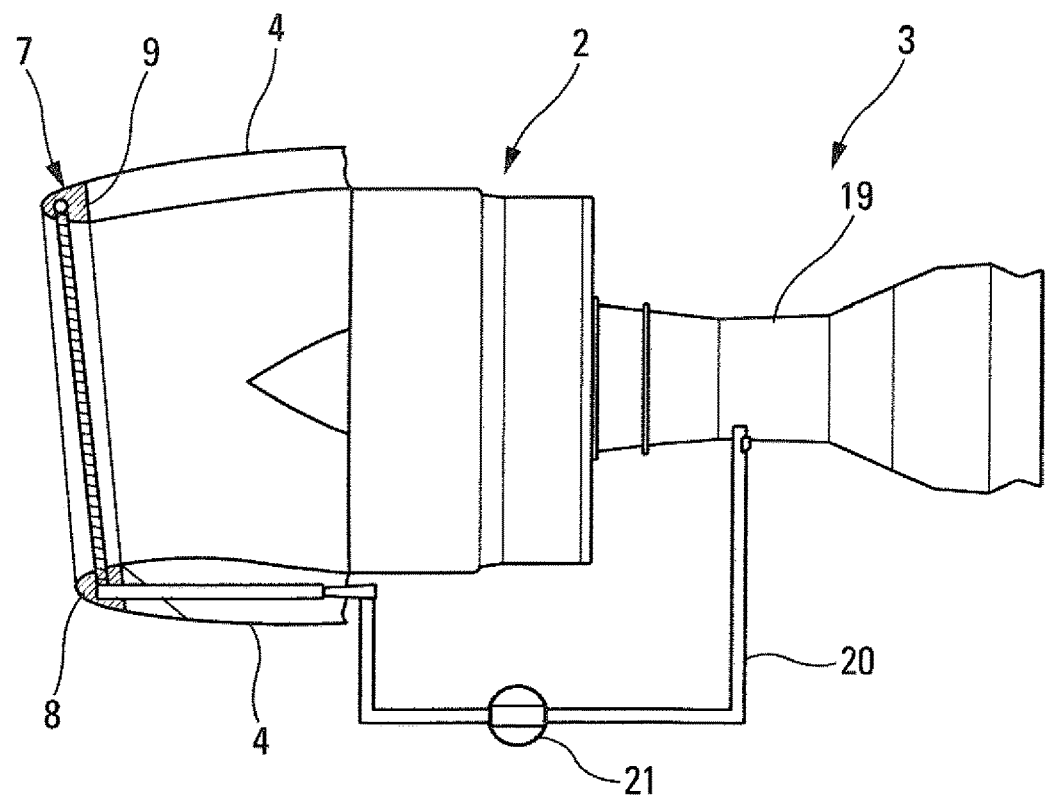
FIG. 1 shows a side view of an aircraft engine comprising a supply of hot air to the annular space of the lip.

An engine 3 nacelle 2 refers to a fairing surrounding an aircraft AC engine 3 (FIG. 1), such as an aircraft AC turbofan.

The nacelle 2 generally comprises an outer shroud 4, an inner shroud 5 and an air intake lip 7. The two shrouds 4 and 5 are generally coaxial and form a space between them. The lip 7 joins the two shrouds 4 and 5 together.

The outer shroud 4 forms an outer cover of the nacelle 2. The inner shroud 5 is provided with at least one acoustic panel 6. The lip 7 forms a leading edge of the nacelle 2.

The nacelles are usually fitted with acoustic panels covering the inner wall of the nacelles 2 at the air intakes upstream of the fans 22. Generally, the acoustic panels 6 have a sandwich structure including one or more layers of honeycomb-like cellular structure suitable for trapping noise. This layer of cellular structure has an outer face covered with a porous layer, referred to as the acoustic skin, and an inner face covered with an impermeable layer, referred to as the solid skin.

The protection system 1 comprises a heat exchanger device 11 configured to transfer heat 14 emitted by a heat source to the one or more acoustic panels 6.

The heat exchanger device 11 comprises at least one heat pipe 12 configured to convey the heat 14 from the heat source to the one or more acoustic panels 6.

A heat pipe 12 generally refers to a heat-conducting element operating according to the principle of heat transfer by phase transition of a fluid.

The heat exchanger device 1 further comprises a heat transfer fluid and at least one evaporator 13 that is thermally connected to the heat source. The one or more evaporators 13 are configured to extract at least a portion of the heat 14 supplied by the heat source. The heat 14 is then transferred to the heat transfer fluid (FIGS. 2, 3 and 4).

The heat exchanger device 1 also comprises at least one condenser 15 attached to the inner shroud 5. The heat 14 extracted by the one or more evaporators 13 is transferred to the one or more condensers 15 via the heat transfer fluid. The one or more condensers 15 are configured to deliver at least a portion of the heat 14 extracted by the one or more evaporators 13 to the one or more acoustic panels 6.

Preferably, the condensers 15 are distributed over the entire inner shroud 5.

Figure 3:
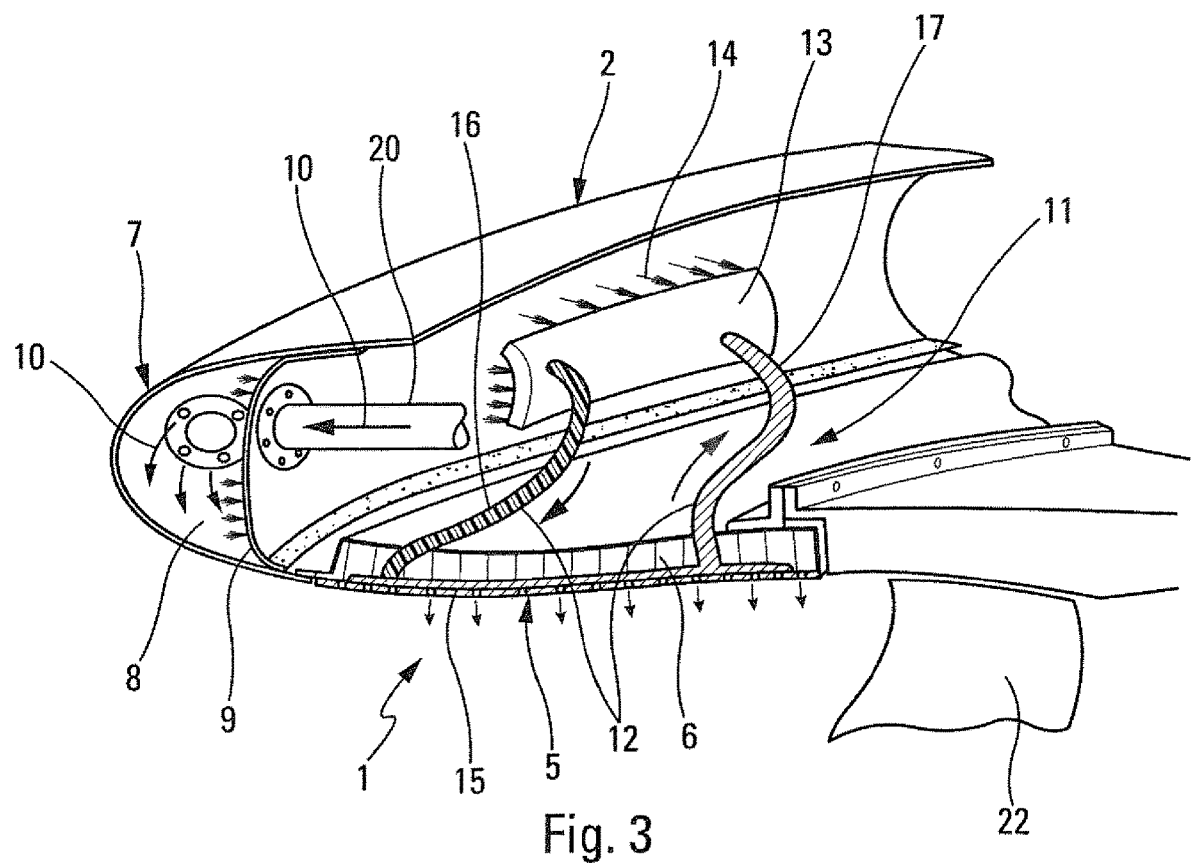
FIG. 3 shows a cut-away view in perspective of a lip comprising the frost protection system according to one embodiment.
Figure 4:
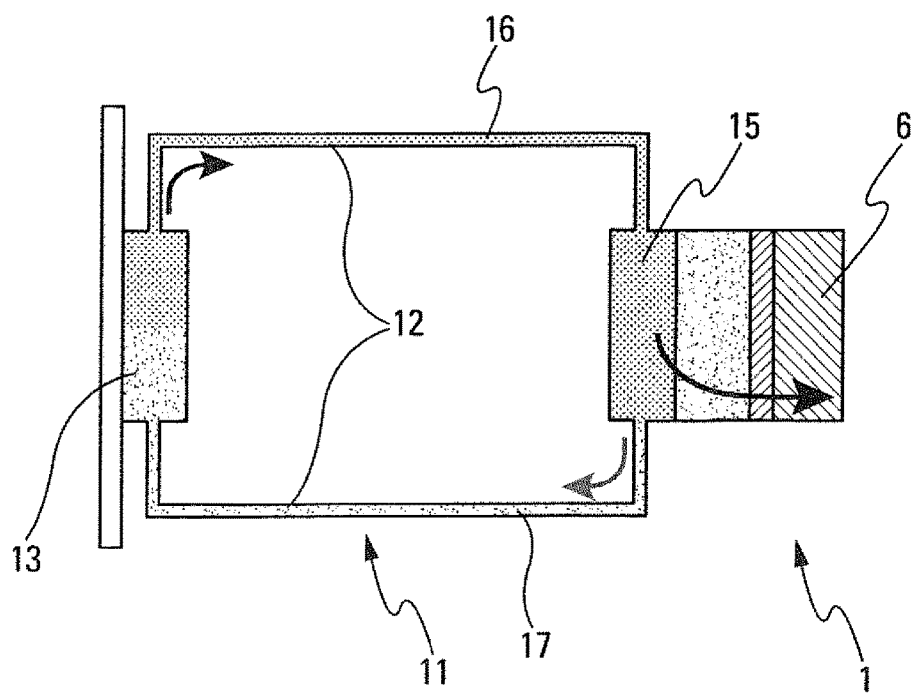
FIG. 4 shows a schematic view of the frost protection system according to one embodiment.

Each of the evaporators 13 is fluidically connected to at least one condenser 15 by at least one heat pipe 12 (FIGS. 2, 3 and 4).

Advantageously, the one or more heat pipes 12 comprise at least one steam pipe 16 configured to convey, from the evaporator 13 to the condenser 15, the heat transfer fluid vaporized by the heat 14 extracted by the evaporator 13. The one or more heat pipes 12 also comprise at least one liquid pipe 17 configured to convey, from the condenser 15 to the evaporator 13, the heat transfer fluid condensed by cooling in the condenser 15.

The liquid pipe 17 may be a pipe allowing the condensed heat transfer fluid to return to the evaporator 13 by gravity or capillary action.

According to one embodiment, the one or more heat pipes 12 comprise a central pipe and a peripheral pipe surrounding the central pipe. The central pipe may correspond to the steam pipe 16 and the peripheral pipe may correspond to the liquid pipe 17.

Figure 5:
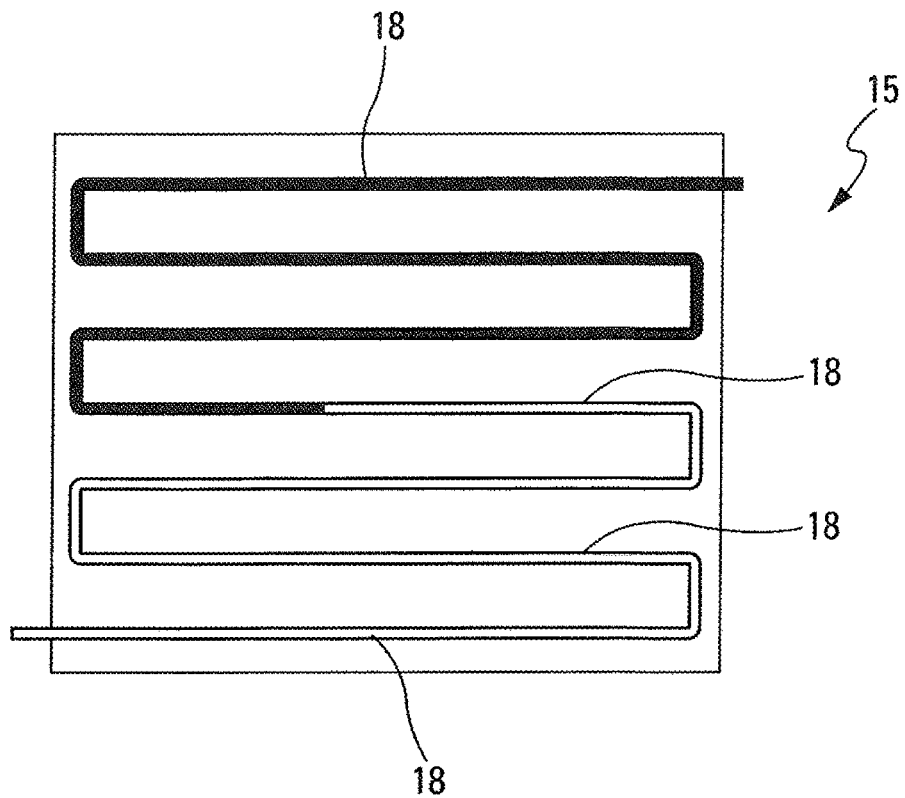
FIG. 5 shows a schematic view of a condenser according to one embodiment.

Advantageously, the one or more condensers 15 comprise one or more heating channels 18 incorporated within the one or more acoustic panels 6 (FIG. 5).

The lip 7 has an annular space 8 which is closed by an internal partition 9. The internal partition 9 separates the annular space 8 from the rest of the space formed between the two shrouds 4 and 5.

Generally, the annular space 8 is composed of two D-ducts forming a ring which is located just behind the leading edge.

The annular space 8 of the lip is arranged to receive a hot air supply 10.

According to one embodiment, the heat source corresponds to the internal partition 9 heated by the hot air 10 being supplied to the annular space 8 of the lip 7.

Nonlimitingly, the internal partition 9 is generally heated to temperatures ranging from 250° C. to 450° C.

Advantageously, at least one heat pipe 12 is configured to transfer the heat 14 from the internal partition 9 to the one or more acoustic panels 6.

The one or more evaporators 13 are thus configured to extract at least a portion of the heat 14 supplied through the internal partition 9 by the hot air 10 being supplied to the annular space 8 of the lip 7. The heat 14 is then transferred to the heat transfer fluid (FIGS. 2, 3 and 4).

Preferably, the evaporators 13 are distributed over the entire internal partition 9.

The hot air 10 being supplied to the annular space 8 may arise from an air-heating device 19 of the aircraft AC. The air-heating device 19 is configured to produce the hot air 10 being supplied to the annular space 8 of each of the nacelles 2.

For example, the aircraft AC comprises at least one duct 20 linking the one or more air-heating devices 19 to the annular space 8 of each of the nacelles 2. The one or more ducts 20 are configured to convey the hot air 10 produced by the air-heating device 19 to the annular space 8 of the lip 7. The aircraft AC also comprises at least one valve 21 for each of the ducts 20 which is configured to regulate the pressure and the flow rate of the hot air 10 flowing through the one or more ducts 20.

The one or more ducts 20 may corresponds to ducts or piccolo tubes.

For example, the air-heating device 19 corresponds to compression stages of the engine 3 surrounded by the nacelle 2. Thus, the compression stages of an engine 3 supply hot air 10 to the annular space 8 of the lip 7 of the nacelle 2 which surrounds the engine 3.

Thus, the heating device 19 supplies hot air 10 to the annular space 8 of the lip 7. The hot air 10 then flows through the annular space 8 of the lip 7 and heats the internal partition 9. The heat of the internal partition 9, heated by the hot air 10, is then extracted by the one or more evaporators 13 attached to the internal partition 9. To do this, the heat transfer fluid in the one or more evaporators 13 is vaporized and is conveyed to the one or more condensers 15 by the steam pipe 16 of the one or more heat pipes 12. The heat is therefore transmitted to the acoustic panels 6 via the one or more condensers 15 in which the heat transfer fluid is condensed by supplying the heat to the condensers 15. The condensed heat transfer fluid subsequently returns to the one or more evaporators 13 via the one or more heat pipes 12.

This protection system 1 allows heat to be transferred efficiently from the internal partition 9 to the acoustic panels 6. Additionally, the protection system 1 makes it possible to use the heat at the internal partition 9 heated by the hot air and therefore to use the heat supplied by the hot air 10 arising from the heating device 19 more efficiently.

According to another embodiment, the heat source corresponds to an electrical system of the aircraft AC (not shown).

According to one variant of this embodiment, the electrical system corresponds to an electrical device dedicated to the production of heat for the protection system 1. This electrical device may be supplied with power by the electrical core of the aircraft AC or directly by a generator of the engine.

According to another variant, the electrical system corresponds to a typical electrical device dedicated to supplying power to the aircraft AC. For example, the electrical device is heated more than is necessary in order for the protection device 1 to recover the excess heat.

By virtue of this embodiment, the incorporation of an electrical system with power supply cables in the one or more acoustic panels 6 is avoided.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine nacelle, comprising:
an inner shroud provided with at least one acoustic panel, and
a frost protection system comprising:
a heat exchanger device including at least one heat pipe configured to convey a heat transfer fluid and to transfer heat emitted by a heat source to the at least one acoustic panel,
at least one evaporator thermally connected to the heat source, the at least one evaporator being configured to extract at least a portion of the heat supplied by the heat source, the extracted heat being transferred to the heat transfer fluid;
at least one condenser attached to the inner shroud, the at least one condenser being configured to deliver at least a portion of the heat extracted by the at least one evaporator to the at least one acoustic panel, the extracted heat being transferred to the at least one condenser via the heat transfer fluid;
each of the at least one evaporators being fluidically connected to at least one of the at least one condenser by at least one heat pipe through which the heat transfer fluid flows, and
the nacelle comprises an air intake lip forming a leading edge of the nacelle, the lip having an annular space, the annular space being closed by an internal partition and being arranged to receive a hot air supply,
wherein the heat source corresponds to the internal partition,
wherein the at least one evaporator is connected by attachment to the internal partition, the at least one evaporator is configured to extract at least a portion of the heat supplied through the internal partition by hot air being supplied to the annular space of the lip, the extracted heat being transferred to the heat transfer fluid,
a source of the hot air being supplied to the annular space of the nacelle.

2. The aircraft engine nacelle according to claim 1, wherein the at least one heat pipe comprises:
at least one steam pipe configured to convey, from the at least one evaporator to the at least one condenser, the heat transfer fluid vaporized by the heat extracted by the at least one evaporator;
at least one liquid pipe configured to convey, from the at least one condenser to the at least one evaporator, the heat transfer fluid condensed by cooling in the condenser.

3. The aircraft engine nacelle according to claim 2, comprising:
an air intake lip forming a leading edge of the nacelle, the lip having an annular space, the annular space being closed by an internal partition and being arranged to receive a hot air supply, the at least one evaporator being connected by attachment to the internal partition, the at least one evaporator being configured to extract at least a portion of the heat supplied through the internal partition by hot air being supplied to the annular space of the lip, the extracted heat being transferred to the heat transfer fluid.

4. The aircraft engine nacelle according to claim 1, wherein the at least one condenser comprises at least one heating channel.

5. An aircraft fitted with at least one engine and comprising according to claim 1, the least one engine being surrounded by the nacelle.

6. The aircraft according to claim 5, further comprising:
at least one air-heating device configured to produce the hot air being supplied to the annular space of the nacelle,
at least one duct linking the at least one air-heating device to the annular space of each nacelle, the at least one duct being configured to convey the hot air produced by the air-heating device to the annular space of the lip, at least one valve for each of the at least one duct which is configured to regulate a pressure and a flow rate of the hot air flowing through the at least one duct.

7. The aircraft according to claim 5, wherein the air-heating device corresponds to compression stages of the engine surrounded by the nacelle.

8. The aircraft according to claim 5, further comprising an electrical system corresponding to the heat source.

9. The aircraft according to claim 8, wherein the electrical system corresponds to an electrical device dedicated to production of heat for the frost protection system.

10. The aircraft according to claim 8, wherein the electrical system supplies electrical power to the aircraft.

* * * * *